United States Patent [19]
Liao et al.

[11] Patent Number: 5,999,152
[45] Date of Patent: *Dec. 7, 1999

[54] ELECTRO-OPTIC DISPLAY PROVIDING A GREY SCALE BY UTILIZING VOLTAGE DEPENDENT BIREFRINGENCE

[75] Inventors: York Liao; Hoi Sing Kwok, both of Kowloon, The Hong Kong Special Administrative Region of the People's Republic of China

[73] Assignee: Varintelligent (BVI) Limited, Tortola, Virgin Islands (Br.)

[*] Notice: This patent issued on a continued prosecution application filed under 37 CFR 1.53(d), and is subject to the twenty year patent term provisions of 35 U.S.C. 154(a)(2).

[21] Appl. No.: 08/807,503

[22] Filed: Feb. 27, 1997

Related U.S. Application Data

[63] Continuation of application No. 08/336,078, Nov. 7, 1994, abandoned.

[30] Foreign Application Priority Data

Nov. 8, 1993 [GB] United Kingdom .................... 9322948

[51] Int. Cl.⁶ ...................................................... G09G 3/36
[52] U.S. Cl. ................................. 345/87; 345/92
[58] Field of Search .................................. 345/50, 51, 87, 345/92, 88, 89, 95, 97, 91; 359/40, 59, 93, 87, 67, 63, 74, 76; 349/87, 85, 96, 99, 102, 103

[56] References Cited

U.S. PATENT DOCUMENTS

| | | | |
|---|---|---|---|
| 3,963,312 | 6/1976 | Wild ............................................ | 359/63 |
| 4,105,298 | 8/1978 | Levine et al. ............................... | 359/76 |
| 4,239,346 | 12/1980 | Lloyd ......................................... | 345/87 |
| 4,962,997 | 10/1990 | Baldwin ..................................... | 359/41 |
| 5,003,356 | 3/1991 | Wakai et al. . | |
| 5,243,455 | 9/1993 | Johnson et al. ............................ | 359/93 |
| 5,251,049 | 10/1993 | Sato et al. .................................. | 359/40 |
| 5,377,026 | 12/1994 | Liu et al. . | |
| 5,489,917 | 2/1996 | Ikezaki et al. ............................. | 345/89 |

FOREIGN PATENT DOCUMENTS

| | | |
|---|---|---|
| 0350382A3 | 1/1990 | European Pat. Off. . |
| 0463816A2 | 1/1992 | European Pat. Off. . |
| 0463816A3 | 1/1992 | European Pat. Off. . |
| 0470817A2 | 2/1992 | European Pat. Off. . |
| 0507639A2 | 10/1992 | European Pat. Off. . |
| 0556822A3 | 8/1993 | European Pat. Off. . |
| WO90/09614 | 8/1990 | WIPO . |
| WO94/17440 | 8/1994 | WIPO . |

OTHER PUBLICATIONS

Lipton et al., A 2.5" Diagonal, High Contrast, Dynamic Scatering Liquid Crystal Matrix Display with Video Drivers, SID 78 Digest, pp. 96–97.

P.S. Drzaic, Droplet Size and Shape Effects in Nematic Droplet/Polymer Films, SPIE vol. 1257 Liquid Crystal Displays and Applications (1990), pp. 29–36.

T. Yamazaki et al., A Liquid–Crystal TV Display Panel Incorporating Drivers, Proceedings of the SID, vol. 23/4, 1982, pp. 223–226.

*Primary Examiner*—Chanh Nguyen
*Attorney, Agent, or Firm*—Whitham, Curtis & Whitham

[57] ABSTRACT

The invention relates to an active matrix liquid crystal display device based on voltage control (non-zero driving voltage) of the birefringence (negative or positive) of the liquid crystal cell. In the device a ground (earth) plate comprises a piece of glass with a transparent conductive coating, such as indium tin oxide. A silicon wafer with integrated circuits on it has a coating of polymer for aligning liquid crystal molecules. The coated glass also has a coating for aligning the liquid crystal molecules.

26 Claims, 2 Drawing Sheets

ELECTRO-OPTIC DISPLAY PROVIDING A GREY SCALE BY UTILIZING VOLTAGE DEPENDENT BIREFRINGENCE

This application is a continuation of application Ser. No. 08/336,078, filed Nov. 7, 1994, now abandoned.

BACKGROUND OF THE INVENTION

1. Field of the Invention

The invention relates to a reflective display device, particularly to such a device based on active matrix control or display of an electro-optic material such as a liquid crystal. The display can be fabricated on integrated circuits based on single crystalline silicon wafers.

2. Description of the Prior Art

Commercial active matrix displays are usually based on light transmission They are matrix devices where the transmission of light of each individual pixel is controlled by an electrical voltage. These active matrix liquid crystal displays are commonly based on the twisted nematic (TN) effect of liquid crystal for controlling light transmission, and semiconductor thin film transistors (TFT) for controlling the individual pixel's transmission state. The TFT can be made of materials such as polycrystalline silicon, amorphous silicon or cadmium selenide.

The principle of these active matrix display devices is as follows: incoming light is first polarized by passing through a polarizer, and then sent into the liquid crystal cell, which comprises many pixels. When no voltage is applied on the pixel, the polarization vector of the incoming light will be rotated by the liquid crystal molecules through the TN effect. A polarizer placed at the output side of the liquid crystal cell can be used to transmit either the light (normally on) or reject the light (normally off). When a proper voltage is applied to the pixel, the TN effect disappears and the polarization of the light is unchanged. The light will therefore be rejected (off) or transmitted (on) by the output polarizer, depending on whether the device is normally on or off respectively. Each pixel can be turned on or off independently by the active control of the voltage across it. Gray scale can also be achieved by supplying intermediate voltages. All of such active matrix displays are invariably based on glass substrates and function in the transmission mode. Polarizers are placed in the front and back of the liquid crystal panel. Some displays are viewed in reflection by placing a mirror in the back of the liquid crystal panel. But the operation is, however, transmission, not reflection.

The active control of the display matrix is achieved by controlling the electrical signals on the transistors on each pixel. Additionally, driver electronic circuits are required to control the timing and scanning of the electrical pulses to each pixel. While TFTS are adequate for controlling the transmission state of the pixels, they are undesirable for the driver part of the active matrix display. The most important reason is that they are based on thin semiconductor films grown on glass substrates, and require special processing techniques to provide good yield in manufacturing. TFT integrated circuits are also not easily designed using standard very large scale integrated (VLSI) circuit design tools in the sense that the current-voltage characteristics of TFTS are different from those transistors fabricated on single crystalline silicon.

There have been many attempts to replace TFT on glass by high quality transistors and circuits fabricated on single crystalline silicon wafers. Lipton et al described an active matrix liquid crystal display based on crystalline silicon in 1978. Dynamic light scattering from the liquid crystal was used as the display mechanism. When there is no voltage on the pixel, the light is transmitted. When a voltage is applied, the liquid crystal becomes turbid and scatters the incoming light. Unfortunately, this device has poor contrast and light transmission efficiency. Yamasaki et al described a singular crystalline silicon based device where the display is based on the guest-host effect in dye doped liquid crystals. In this display, the absorption coefficient of the dye is dependent on the orientation of the dye molecules. These guest molecules tend to align themselves with the host liquid crystal molecules. Hence the absorption of the guest/host combination can be controlled by an applied voltage.

The concept of dynamic scattering for display was revived recently due to the invention of polymer dispersed liquid crystals. The liquid crystal droplets dispersed in a polymer film can have very high scattering efficiency, and a high contrast ratio between the on (no scattering) and off (scattering) states. It is therefore a potentially important technology for providing active matrix displays on crystalline silicon. In 1990 Drzaic et al described a reflective active matrix liquid crystal display based on such polymer dispersed liquid crystals. However, there are drawbacks for this technology such as the stability of the liquid crystal polymer and the need to use higher voltages to operate such a display. The reason for the latter requirement is simply that the polymer films cannot be made to be the same thickness (a few microns) as the liquid crystal film in an active matrix liquid crystal display. It is the electric field (voltage divided by thickness) that is important in aligning the liquid crystals.

SUMMARY OF THE INVENTION

According to a first aspect of the invention there is provided An electro-optic apparatus for image display, comprising (i) a tunable birefringent display cell;
(ii) said cell comprising an active matrix controllable display element operable in a reflective mode, whereby incident electromagnetic energy may traverse across the cell a plurality of times; and in which
(iii) on/off states of each pixel require a non-zero driving voltage.

It is preferred that the appartus is adapted to be operable in a non-birefringent state by application of a voltage to the cell.

The means ay provide for traversal of the cell twice. This is an efficient use of incident light, particularly when the means may comprise a metal electrode reflector means, for example comprising aluminium. This is a relatively inexpensive, yet efficient material.

The cell may comprise a silicon chip, suitably a single crystalline silicon cell.

According to a second aspect of the invention there is provided an activated liquid crystal display device including appartus as herinbefore defined.

The device may comprise a plurality of polarizers each adapted to produce a plurality of linearly polarized beams of incident light at a plurality of wavelengths.

There may be a polarizer adapted to produce a linearly polarized beam of incident light; suitably the polarizer may comprise a prism or prisms, particularly two prisms which form a cube.

Alternatively, the polarizer may comprise a sheet or thin film polarizer.

There may be means to provide a colour display, particularly comprising a colour filter or filters.

There may be a polymer coating for aligning the liquid crystal molecules.

The device may comprise one or a plurality of crystalline silicon based liquid cells. This, is a relatively readily manufactured device.

There may be an earth (ground) which may comprise a glass plate with a transparent conductive coating; suitably an indium tin oxide coating.

The display device may include a light source.

The invention extends, it will be understood, to an instrument including an active matrix display device as hereinbefore defined.

In the invention, therefore, use is made of the linear electro-optic effect to provide the display. In a preferred embodiment crystalline silicon is used as the substrate to grow all the controlling transistors for the pixels as well as the driver circuits. This display can work with any electro-optic material which has a voltage dependent birefringence. Liquid crystal has large electric field dependent birefringence. In the invention, the liquid crystals are not aligned as in ordinary TN mode displays. Instead, the molecules are aligned to be substantially exactly parallel throughout the entire display area. In this way, the liquid crystal cell behaves as a birefringent linear electro-optic device. The operation of this display is based on the differential phase retardation of two perpendicular polarization directions of the incoming light beam. If the incoming light beam is linear polarized such that the electric field vector is at 45 degrees to the fast (extraordinary) and slow (ordinary) axes of the liquid crystal cell, then the outgoing beam will have a differential phase retardation between these two fast and slow axes. It can be shown that for a liner electro-optic device, the phase retardation between the fast and slow components can be given by $$Q = 2\Pi \ (ne(v) - no)d/\lambda$$

where ne(V) is the voltage dependent extraordinary refractive index and no is the ordinary refractive index of the liquid crystal, d is the liquid crystal cell thickness and $\lambda$ is the light wavelength. Therefore, by controlling the birefringence of the liquid crystal through an applied voltage, the polarization of the outgoing light beam can be manipulated to provide the on/off states, together with many grey scales. For example, a voltage (which may be zero) that gives a 90 degree (or 270 degrees etc) differential phase retardation upon one pass through the cell will mean that the polarization vector will be rotated 90 degrees upon reflection from the liquid crystal cell. This light beam can be transmitted by a cross polarizer. This is the on state of the liquid crystal cell/pixel. When a voltage gives a 180 degree (or 360 degrees etc) differential phase retardation, the polarization of the reflected beam will not change, and the cross polarizer will block its further transmission. This is the off state for the pixel. Any transmission value through the entire system can be obtained by proper choices of the birefringence through controlling the voltage across pixel.

This reflective liquid crystal display is therefore based on the linear electro-optic effect. It is called reflective because light passes through the liquid crystal cell a plurality of times, suitably twice, upon reflection from one side of the liquid crystal cell. This has to be the case because crystalline silicon is used as the substrate. Transmission through the silicon wafer is impossible, unlike glass based active matrix liquid crystal displays. However, there are transmission optical elements in this system such as the polarizers and lenses. The use of crystalline silicon substrate is now clear. The transistors for controlling and holding the voltages of each individual pixel can be high quality metal-oxide semiconductor (MOS) transistors fabricated on a silicon chip. Moreover, the driver electronics can be fabricated on the same silicon chip using microfabrication technology. The design of these circuits is also compatible with conventional VLSI circuit rules and tools. The pixel can also be made quite small so that the size of the entire chip, including the display matrix and the driver electronics can be quite small with high resolution. This display can be viewed either directly or by projection onto a screen. Depending on the driver circuit, this display can be used to display different kinds of image information. For example, it can be used to display television pictures, it can be used as a computer terminal, or any other type of video display.

Because the display is based on the linear electro-optic effect, besides liquid crystals, other types of electro-optic material can also be used. Liquid crystal is mentioned here only as a convenient embodiment of the invention Examples of other electro-optic materials that can be used include, but not limited to, lead lanthanum zirconium titanate (PLZT), barium titanate (BaTiO3) and many other transparent metal oxides.

BRIEF DESCRIPTION OF THE DRAWINGS

An active matrix display embodying the invention is hereinafter described, by way of example, with reference to the accompanying drawings.

DETAILED DESCRIPTION OF A PREFERRED EMBODIMENT OF THE INVENTION

Figure 1:
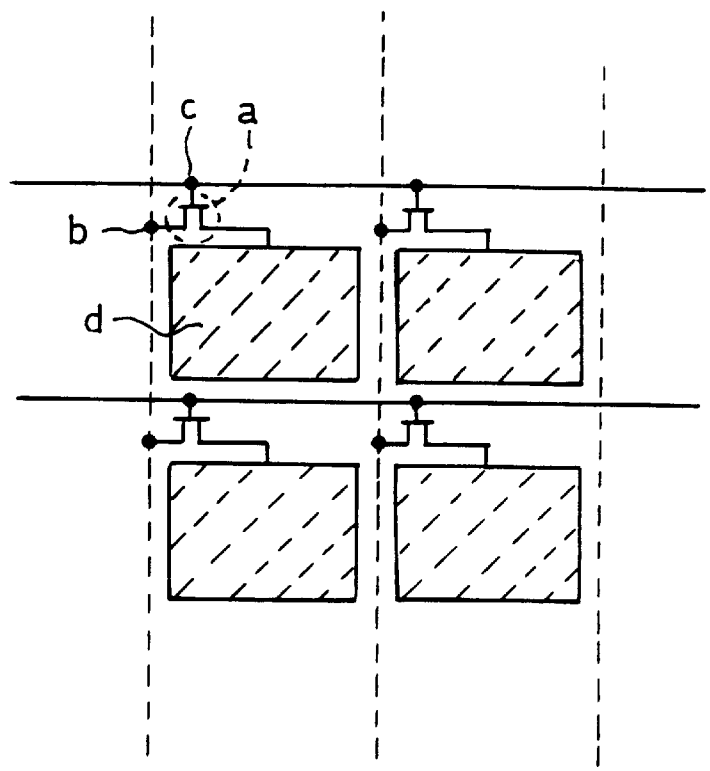
FIG. 1 is a schematic diagram of an active matrix display showing an MOS transistor and a metal electrode, according to the invention.
Figure 2:
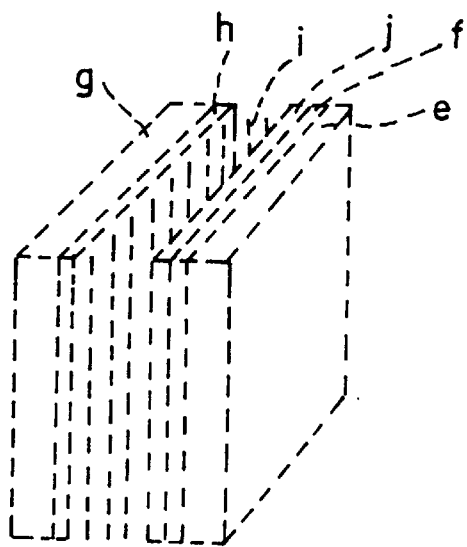
FIG. 2 is a cross sectional view of a pixel showing the various layers of materials.

Referring to the drawings, there is shown an electro-optic apparatus such as a liquid crystal cell for image display, comprising a tunable birefringent display and a control element operable in a reflective mode whereby to traverse incident light across the cell a plurality of times, two in the embodiment. As schematically shown in FIG. 1, an entire display consists of a N by M array of pixels, where N, M are numbers compatible with standard display resolution for both computer terminals and televisions. The pixels are in the embodiment fabricated on a single crystalline silicon wafer using microelectronics technology. Each pixel forms apparatus for image display and has a MOS transistor 'a' as shown for controlling the voltage across the liquid crystal cell. The source 'b' of the MOS transistor is pulsed electrically, the voltage of which determines the voltage across a liquid crystal cell for that pixel. The gate 'c' of the MOS (metal oxide semi-conductor) transistor is also driven by electrical pulses that turns the transistor on or off. The gate and source pulses are sequenced so that the display is scanned row by row. A metal pad 'd' which is slightly smaller than the pixel size and connected to the drain of the MOS transistor acts as an electrode of the liquid crystal pixel. This metal can be aluminium or any other metal compatible with microfabrication process and other materials. The liquid crystal between this metal pad 'd' and the ground plane forms the unit of display (pixel). As shown in FIG. 2, the ground (earth) plane, consists of a piece of glass 'e' with a transparent conductive coating 'f', such as indium tin oxide (ITO). A silicon wafer 'g' with the integrated circuits fabricated on it has a coating of polymer 'h' for aligning the liquid crystal molecules 'i'. The ITO coated glass also has a polymer coating 'j' for aligning the liquid crystal molecules. In the embodiment, buffing of the aligning polymer is such that the liquid crystal molecules are all aligned parallel to each other when no voltage is applied to the cell. This linear alignment is schematically indicated in FIG. 2.

Figure 3:
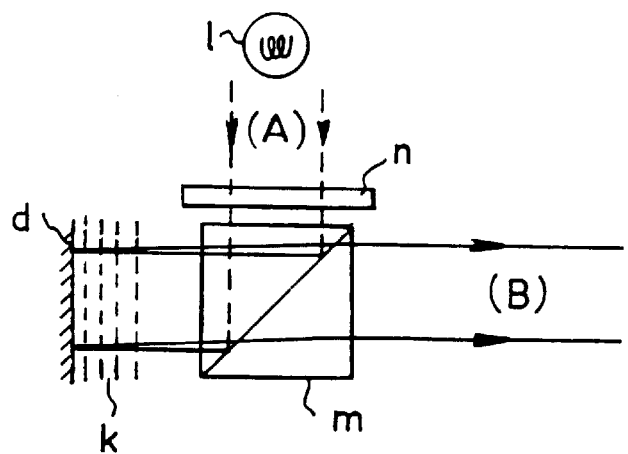
FIG. 3 is a preferred embodiment of the optical arrangement.

FIG. 3 shows the light path for a typical preferred embodiment crystal display device according to the invention. It shows a single crystalline silicon based liquid crystal cell 'k'. The metal pad 'd' behaves as a mirror for the light. The light source 'l' can be halogen lamp (or any other bright light source). In the embodiment, the light source is polarized linearly by reflecting off a cube prism polarizer 'm' and shines on the liquid crystal display perpendicularly. The polarization of the light is such that it makes a 45 degree angle with the alignment direction of the liquid crystal molecules. Upon reflection from the metal pad 'd', the light is allowed to go into the same cube polarizer 'm'. If no change is made to the polarization state of the light, the light will be reflected by the polarizer and goes back towards the light source in the path (A). If the polarization of the light is rotated 90 degrees, it will pass through the polarizer and enter path (B). Path (B) is the viewing direction for the display. This light can then be viewed directly, or can be projected onto a screen by a suitable light projection mechanism (which is not shown).

A colour filter 'n' may be necessary for a broadband light source. Alternatively, the colour filter can be incorporated into the liquid crystal cell by coating techniques. For output requiring colours, multiplexing of red, green and blue pixels on the same display, or the use of three separate displays may be required.

It will be appreciated that many variations of the embodiment shown in FIG. 3 are possible. Thus FIGS. 4 and 5 show possible arrangements of optical layout to achieve the display function.

Figure 4:
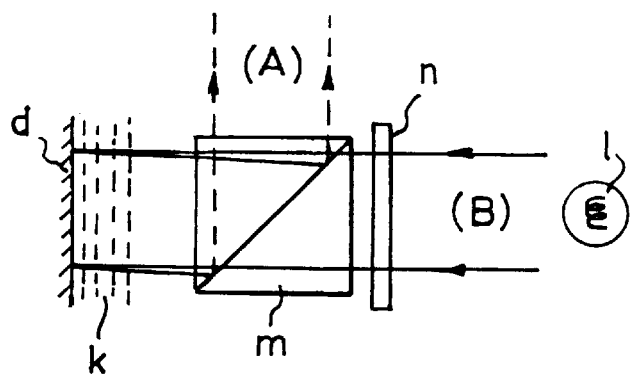
FIG. 4 is a variation of the preferred embodiment in FIG. 3.

FIG. 4 is basically similar to the embodiment in FIG. 3.

Figure 5:
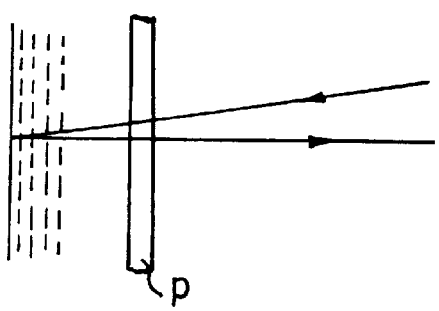
FIG. 5 is a variation of the preferred embodiment in FIG. 3.

FIG. 5 shows an embodiment where ambient light can be used. It requires a thin film polarizer sheet 'p' positioned on the liquid crystal cell. In this case, the input and output light beams to the liquid crystal cell should have the same polarization in the on state. Embodiments in FIG. 3 and 4 are suitable for projection displays while FIG. 5 is more suitable for direct viewing under ambient lighting.

It will be understood that using the invention, polarisation of the light is manipulated to produce a displaying effect. The intensity of the light is changed to provide the display effect. The light polarizers are an integral part of the apparatus. Therefore, in order to achieve this, both the 'on' and 'off' state of the individual pixels require a non-zero driving voltage. Stated in another way the invention requires a voltage control all the time for both 'on' and 'off' states. Thus the invention can work well with positive and negative birefringences.

In all embodiments, alignment layers of the liquid crystal molecules are anti-parallel rubbed so that the liquid crystal molecules are substantially parallel to the cell wall at zero voltage. When the voltage is applied (all the time) the liquid molecules tilt in the same direction.

Thus, using the devices described herein with reference to the drawings, it is possible to provide:

1. An active matrix liquid display device based on voltage control of the birefringence of the liquid crystal cell with transistors controlling the on/off state of the individual pixels. The polarization state of the light going through the device can be modified by an applied voltage to the individual pixels. The display device is capable of being fabricated on single crystalline silicon wafers which may have on it all the transistors for the active control of the individual pixels, together with all the driver circuits and integrated circuits for voltage control, scanning and timing, all on a single silicon chip. Each pixel of the active matrix display contains a reflective metal electrode fabricated on the silicon substrate. The display is based on light reflection and the light has to traverse the liquid crystal cell twice due to reflection from metal electrodes on each pixel.

2. That the linear electro-optic material can be used for this display. In particular, liquid crystals can be used.

3. That the displayed image can be viewed directly, or projected onto a screen for large area displays.

4. That external optics can be used to form the input light beam when a light source is used for projection display. Ambient light can be used for viewing the display directly.

5. That a cube prism polarizer is used to produce a linearly polarized light beam into the display device, and also to select the properly polarized output beam for display.

6. That a sheet polarizer can also be used to obtain the display.

7. That the said display is fabricated on a crystalline silicon wafer. The wafer is arranged to have a matrix of pixels, each one of which can be turned on (bright) or off (dark), or any brightness in between.

8. That the display can be in any colour.

9. That three of such displays in red, green and blue can be used in combination to provide multi-colour images.

10. That the pixels of the display can have an arrangement of colours so that multi-colour image can be obtained in one display device.

We claim:

1. An electro-optic apparatus for image display, comprising a tunable birefringent display cell, including a material having positive or negative birefringence and having an ordinary index of refraction and a voltage dependent extraordinary index of refraction; said display cell comprising an active matrix controllable display element, including reflector means for causing incident electromagnetic energy to traverse across the cell a plurality of times; and polarizing means for polarizing light incident on said display cell and directing light reflected by said reflector means, said polarizing means being oriented relative to said display cell such that both on and off states or any brightness in between said on and off states of each pixel require a driving voltage at which the extraordinary index of refraction varies with voltage, said driving voltage being defined as a first driving voltage and a second driving voltage, said first driving voltage being greater than said second driving voltage, and said on state being associated with one of said first driving voltage and said second driving voltage and said off state being associated with one of said second driving voltage and said first driving voltage, respectively.

2. Appartus according to claim 1, being operable in a non-birefringent state by application of voltage to the cell.

3. Apparatus as defined in claim 1, wherein the display comprises a liquid crystal display.

4. Apparatus as defined in claim 1, where there is means providing for traversal of the cell twice by incident light energy.

5. Appartus as defined in claim 4, wherein said means comprises an metal electrode reflector means.

6. Apparatus as defined in claim 5, wherein said means comprises an aluminium electrode reflector means.

7. Apparatus as defined in claim 1, wherein said cell comprises a silicon chip.

8. Apparatus as recited in claim 1, further including
means for aligning molecules of said material substantially parallel to a major surface of said display cell at zero voltage.

9. Apparatus as recited in claim 8, wherein said means for aligning includes alignment layers which have been rubbed anti-parallel.

10. Apparatus as recited in claim 1, wherein said polarizing means comprises a sheet polarizer.

11. An active matrix liquid crystal display device, comprising:
a tunable birefringent display cell, including a material having positive or negative birefringence and having an ordinary index of refraction and a voltage dependent extraordinary index of refraction; said display cell comprising
an active matrix controllable display element, including reflector means for causing incident electromagnetic energy to reverse across the cell a plurality of times; and
polarizing means for polarizing light incident on said display cell and directing light reflected by said reflector means, said polarizing means being oriented relative to said display cell such that both on and off states and any brightness in between said on and off states of each pixel require a driving voltage at which the extraordinary index of refraction varies with voltage, said driving voltage being a low driving voltage and a high driving voltage where said high driving voltage is greater than said low driving voltage, and said on state being associated with one of said low driving voltage and said high driving voltage and said off state being associated with one of said high driving voltage and said low driving voltage, respectively.

12. A display device as defined in claim 11, wherein said polarizing means is adapted to produce a linearly polarized beam of incident light.

13. A display device as defined in claim 12, wherein there is a plurality of polarizes each adapted to produce a plurality of linearly polarized beams of incident light at a plurality of wavelengths.

14. A display device as recited in claim 13, wherein a polarizer of said plurality of polarizers comprises a sheet polarizer.

15. A display device as defined in claim 12, wherein there is a plurality of polarizers each comprising a prism.

16. A display deice as defined in claim 12, wherein the polarizer comprises two prisms to form a cube.

17. A display device as defined in claim 12, wherein the polarizer comprises a thin film polarizer.

18. A display device as defined in claim 11, wherein there is means to provide a colour display.

19. A display device as defined in claim 18, wherein the colour means comprises a colour filter.

20. A display device as defined in claim 11, wherein there is a coating for aligning the liquid crystal molecules.

21. A display device as defined in claim 11, wherein said device comprises a plurality of crystalline silicon based liquid cells.

22. A dispay device as defined in claim 11, wherein there is a ground plate comprising a glass plate with a transparent conductive coating.

23. A display device as defined in claim 22, wherein the conductive coating comprises an indium tin oxide coating.

24. A display device as defined in claim 11, wherein there is a light source.

25. An electronic apparatus including an electro-optic image display, said electro-optic image display comprising:
a tunable birefringent display cell, including a material having positive or negative birefringence and having an ordinary index of refraction and a voltage dependent extraordinary index of refraction; said display cell comprising
an active matrix controllable display element, including reflector means for causing incident electromagnetic energy to traverse across the cell a plurality of times; and
polarizing means for polarizing light incident on said display cell and directing light reflected by said reflector means, said polarizing means being oriented relative to said display cell such that both on and off states and any brightness in between said on and off states of each pixel require a driving voltage at which said extraordinary index of refraction varies with voltage, said driving voltage being defined as a first driving voltage and a second driving voltage, said first driving voltage being greater than said second driving voltage, and said on state being associated with one of said first driving voltage and said second driving voltage and said of state being associated with one of said second driving voltage and said first driving voltage, respectively.

26. An electronic apparatus as recited in claim 25, wherein said polarizing means comprises a sheet polarizer.

* * * * *